(12) United States Patent
Krishnamoorthi

(10) Patent No.: US 7,720,162 B2
(45) Date of Patent: May 18, 2010

(54) PARTIAL FFT PROCESSING AND DEMODULATION FOR A SYSTEM WITH MULTIPLE SUBCARRIERS

(75) Inventor: Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 896 days.

(21) Appl. No.: 11/372,397

(22) Filed: Mar. 8, 2006

(65) Prior Publication Data

US 2006/0215777 A1 Sep. 28, 2006

Related U.S. Application Data

(60) Provisional application No. 60/660,899, filed on Mar. 10, 2005.

(51) Int. Cl.
*H04K 1/10* (2006.01)
(52) U.S. Cl. .................. 375/260; 375/267; 375/316; 375/295; 708/404; 708/405; 370/210
(58) Field of Classification Search ............ 375/316, 375/295; 708/404, 405; 370/210
See application file for complete search history.

(56) References Cited

U.S. PATENT DOCUMENTS

| | | | | |
|---|---|---|---|---|
| 6,349,118 | B1 * | 2/2002 | Caso et al. ................ | 375/295 |
| 6,351,759 | B1 * | 2/2002 | Moretti et al. ............ | 708/405 |
| 6,363,049 | B1 * | 3/2002 | Chung ..................... | 370/210 |
| 6,711,221 | B1 | 3/2004 | Belotserkovsky et al. | |
| 7,007,056 | B2 * | 2/2006 | Ryu ......................... | 708/404 |
| 7,324,606 | B2 * | 1/2008 | Eilts et al. ................ | 375/316 |
| 7,551,545 | B2 | 6/2009 | Krishnamoorthi et al. | |
| 2002/0178195 | A1 * | 11/2002 | Ryu ......................... | 708/404 |
| 2003/0081695 | A1 * | 5/2003 | Eilts et al. ................ | 375/316 |
| 2005/0182806 | A1 * | 8/2005 | Krishnamoorthi et al. ... | 708/404 |

OTHER PUBLICATIONS

Sorensen et al, "Efficient Computation of the DFT With Only a Subset of Input or Output Points", IEEE Transactions on Signal Processing, IEEE Service Center, New York, NY, US, vol. 41, No. 3 (Mar. 1, 1993), pp. 1184-1199, XP000364672, ISSN: 1053-587X, Section II.B, figure 2.

(Continued)

*Primary Examiner*—Sudhanshu C Pathak
(74) *Attorney, Agent, or Firm*—Gerald P. Joyce, III

(57) ABSTRACT

Techniques for efficiently performing partial FFT for subcarriers of interest are described. The N total subcarriers may be arranged into M sets. Each set may contain K subcarriers uniformly distributed across the N total subcarriers, where M·K=N. For the partial FFT, pre-processing is initially performed on time-domain samples to obtain intermediate samples. The pre-processing may include performing M-point FFTs on the time-domain samples and multiplying the FFT outputs with unit complex values. For each set of subcarriers of interest, a K-point FFT is performed on a set of intermediate samples to obtain a set of frequency-domain symbols for that set of subcarriers. Since K is typically much smaller than N, substantial savings in computation and power may be realized when only one or few sets of subcarriers are of interest.

29 Claims, 11 Drawing Sheets

OTHER PUBLICATIONS

Cooklev et al, "Generalized and Partial FFT" IEICE Transactions on Fundamentals of Electronics, Communications and Computer Sciences, Engineering Sciences Society, Tokyo, JP, vol. E77-A, No. 9, (Sep. 1, 1994), pp. 1466-1473, XP000477498, ISSN: 0916-85013, Sections 1., 1., and 3.

Shousheng He et al: "Computing Partial DFT for Comb Spectrum Evaluation", IEEE Signal Processing Letters, IEEE Service Center, Piscataway, NJ, US, vol. 3, No. 6, (Jun. 1, 1996), pp. 173-175, XP000593173, ISSN: 1070-9908, Sections I. and II.

Sorensen, H.V. et al: "Efficient Computation of the DFT with Only a Subset of Input or Output Points" IEEE Transactions on Signal Processing, IEEE Service Center, New York, NY, US, vol. 41, No. 3, Mar. 1, 1993, pp. 1184-1199.

Cooklev, T. et al: "Generalized and Partial FFT" IEICE Transactions on Fundamentals of Electronics, Communications and Computer Sciences, Engineering Sciences Society, Tokyo, Japan, vol. E77-A, No. 9, Sep. 1, 1994, pp. 1466-1473.

Shousheng, He et al: "Computing Partial DFT for Comb Spectrum Evaluation" IEEE Signal Processing Letters, IEEE Service Center, Piscataway, NJ, US, vol. 3, No. 6, Jun. 1, 1996, pp. 173-175.

International Search Report, PCT/US2006/008769, International Searching Authority, European Patent Office, Jul. 19, 2006.

Written Opinion, PCT/US2006/008769, International Searching Authority, European Patent Office, Jul. 19, 2006.

International Preliminary Report on Patentability, PCT/US2006/008769, The International Bureau of WIPO, Geneva, Switzerland, Sep. 12, 2007.

* cited by examiner

N = 4096, M = 8, K = 512

500

Pre-processing →

FFT Processing ↓

| | 1 | 2 | 3 | 4 | 5 | 6 | 7 | 8 |
|---|---|---|---|---|---|---|---|---|
| | 0 | 512 | 1024 | 1536 | 2048 | 2560 | 3072 | 3584 |
| | 1 | 513 | 1025 | 1537 | 2049 | 2561 | 3073 | 3585 |
| | 2 | 514 | 1026 | 1538 | 2050 | 2562 | 3074 | 3586 |
| | 3 | 515 | 1027 | 1539 | 2051 | 2563 | 3075 | 3587 |
| | 4 | 516 | 1028 | 1540 | 2052 | 2564 | 3076 | 3588 |
| | ⋮ | ⋮ | ⋮ | ⋮ | ⋮ | ⋮ | ⋮ | ⋮ |
| | 509 | 1021 | 1533 | 2045 | 2557 | 3069 | 3581 | 4093 |
| | 510 | 1022 | 1534 | 2046 | 2558 | 3070 | 3582 | 4094 |
| | 511 | 1023 | 1535 | 2047 | 2559 | 3071 | 3583 | 4095 |

Pre-processing →

FFT Processing ↓

| | 1 | 2 | 3 | 4 | 5 | 6 | | M |
|---|---|---|---|---|---|---|---|---|
| | 0 | K | 2K | 3K | 4K | 5K | ••• | (M−1)K |
| | 1 | K+1 | 2K+1 | 3K+1 | 4K+1 | 5K+1 | ••• | (M−1)K+1 |
| | 2 | K+2 | 2K+2 | 3K+2 | 4K+2 | 5K+2 | ••• | (M−1)K+2 |
| | 3 | K+3 | 2K+3 | 3K+3 | 4K+3 | 5K+3 | ••• | (M−1)K+3 |
| | 4 | K+4 | 2K+4 | 3K+4 | 4K+4 | 5K+4 | ••• | (M−1)K+4 |
| | ⋮ | ⋮ | ⋮ | ⋮ | ⋮ | ⋮ | ⋮ | ⋮ |
| | K−3 | 2K−3 | 3K−3 | 4K−3 | 5K−3 | 6K−3 | ••• | N−3 |
| | K−2 | 2K−2 | 3K−2 | 4K−2 | 5K−2 | 6K−2 | ••• | N−2 |
| | K−1 | 2K−1 | 3K−1 | 4K−1 | 5K−1 | 6K−1 | ••• | N−1 |

*FIG. 5B*

PARTIAL FFT PROCESSING AND DEMODULATION FOR A SYSTEM WITH MULTIPLE SUBCARRIERS

The present application claims priority to provisional U.S. Application Ser. No. 60/660,899, entitled "A Power Efficient System and Method for Performing FDM in OFDM based Systems," filed Mar. 10, 2005, assigned to the assignee hereof and incorporated herein by reference.

BACKGROUND

I. Field

The present disclosure relates generally to communication, and more specifically to techniques for performing fast Fourier transform (FFT) processing and demodulation in a system with multiple subcarriers.

II. Background

Orthogonal frequency division multiplexing (OFDM) is a modulation technique that partitions a frequency band (e.g., the system bandwidth) into multiple (N) orthogonal subcarriers. These subcarriers are also referred to as tones, bins, subbands, and so on. With OFDM, each subcarrier may be independently modulated with data.

OFDM is widely used in various communication systems. For example, an orthogonal frequency division multiple access (OFDMA) system can support multiple users using OFDM. The N subcarriers may be used for data and pilot transmission in various manners, depending on the system design. For example, the OFDMA system may partition the N subcarriers into multiple sets of subcarriers and may allocate each subcarrier set to a different user. Multiple users may then be supported simultaneously via their assigned subcarrier sets.

In many instances, it is only necessary to demodulate a subset of the N total subcarriers in an OFDM-based system. A straightforward method to process a subset of the N total subcarriers is to perform an N-point FFT on time-domain samples to obtain frequency-domain symbols for all N subcarriers. The symbols for the subcarriers of interest are then extracted and processed, and the symbols for all other subcarriers are discarded. This straightforward method requires an N-point FFT for all N subcarriers even if only a small subset of these N subcarriers is of interest.

There is therefore a need in the art for techniques to more efficiently perform FFT processing and demodulation in a system with multiple subcarriers.

SUMMARY

Techniques for efficiently performing "partial FFT" and demodulation for subcarriers of interest are described herein. These techniques may be used for OFDM-based systems and other systems with multiple subcarriers.

In one aspect, the partial FFT utilizes smaller-size FFTs to obtain frequency-domain symbols for the subcarriers of interest. The N total subcarriers may be arranged into M sets. Each set may contain K subcarriers that are uniformly distributed across the N total subcarriers, where M·K=N. For the partial FFT, pre-processing is initially performed on time-domain samples to obtain intermediate samples. The pre-processing may include performing M-point FFTs on the time-domain samples and multiplying the outputs of the M-point FFTs with unit complex values, as described below. For each set of subcarriers of interest, a K-point FFT is performed on a set of intermediate samples to obtain a set of frequency-domain symbols for that set of subcarriers. Since K is typically much smaller than N, substantial savings in computation and power may be realized when only one or few sets of subcarriers are of interest.

In another aspect, data is efficiently stored and retrieved for pre-processing and FFT processing. The time-domain samples may be stored in a buffer in a first direction, e.g., column-wise. Thereafter, the time-domain samples may be retrieved from the buffer in a second direction, e.g., row-wise, for pre-processing. The intermediate samples may be stored back in the buffer in the second direction, e.g., replacing the retrieved time-domain samples. The intermediate samples may then be retrieved from the buffer in the first direction for FFT processing.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 5A shows a buffer for N=4096, M=8, and K=512.

FIG. 5B shows a buffer for any N, M and K.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein may be used for various systems with multiple subcarriers such as systems that utilize OFDM, systems that utilize single-carrier frequency division multiple access (SC-FDMA), and so on. OFDM and SC-FDMA partition a frequency band into multiple (N) orthogonal subcarriers. In general, modulation symbols are sent in the frequency domain with OFDM and in the time domain with SC-FDMA. The techniques may also be used for various communication systems such as multiple-access systems (e.g., OFDMA systems), broadcast systems (e.g., DVB-H, ISDB-T, and MediaFLO systems), and so on.

Figure 1:
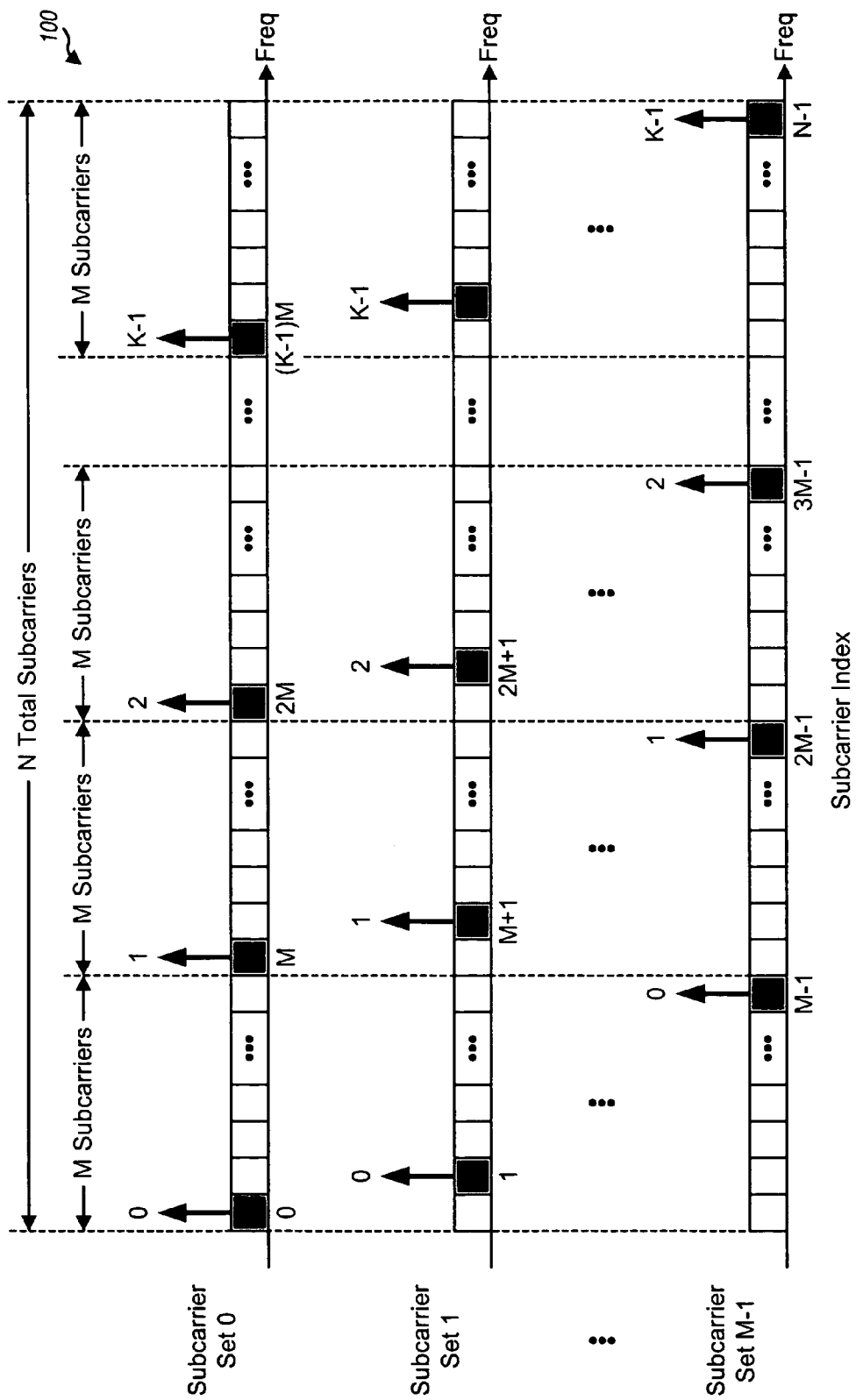
FIG. 1 shows an exemplary subcarrier structure.

FIG. 1 shows an exemplary subcarrier structure 100 for OFDM and SC-FDMA. The overall system bandwidth of BW MHz is partitioned into N orthogonal subcarriers that are given indices of 0 through N−1, where N may be any integer value but is typically a power of two. The spacing between adjacent subcarriers is BW/N MHz. A system may use only the center subcarriers for transmission and may reserve some subcarriers in the two band edges as guard subcarriers to allow the system to meet spectral mask requirements. For simplicity, the following description assumes that all N subcarriers may be used for transmission.

In subcarrier structure 100, the N subcarriers are arranged into M disjoint or non-overlapping interlaces, which are also referred to as subcarrier sets. The interlaces are disjoint in that each of the N total subcarriers belongs in only one interlace. Each interlace contains K subcarriers that are given indices of 0 through K−1, where M·K=N. As a specific example, the system may have N=4096 total subcarriers and M=8 interlaces, with each interlace containing K=512 subcarriers. The K subcarriers in each interlace are uniformly distributed across the N total subcarriers such that consecutive subcarriers in the interlace are spaced apart by M subcarriers. Hence, interlace m, for m=0, . . . , M−1, contains subcarriers m, M+m, . . . , (K−1)·M+m. The subcarriers in each interlace are thus interlaced with the subcarriers in the other M−1 interlaces. The N total subcarriers may be arranged in other manners. For simplicity, the following description assumes the subcarrier structure shown in FIG. 1.

An OFDM symbol may be generated as follows. A data symbol is mapped to each subcarrier used for data transmission, a pilot symbol is mapped to each subcarrier used for pilot transmission, and a zero symbol is mapped to each unused subcarrier. As used herein, a data symbol is a modulation symbol for data, a pilot symbol is a modulation symbol for pilot, a modulation symbol is a complex value for a point in a signal constellation (e.g., for M-PSK or M-QAM), a zero symbol is a complex value of zero, a symbol is typically a complex value, and pilot is data that is known a priori by both a transmitter and a receiver. An N-point inverse FFT (IFFT) is performed on the N data, pilot and zero symbols to obtain a sequence of N time-domain chips. The last C chips are copied to the start of the sequence to form an OFDM symbol that contains N+C chips. The C copied chips are often called a cyclic prefix or a guard interval, and C is the cyclic prefix length. The cyclic prefix is used to combat inter-symbol interference (ISI).

An SC-FDMA symbol may be generated as follows. K modulation symbols to be sent on one interlace are transformed to the frequency domain with a K-point FFT to obtain K frequency-domain symbols. These K frequency-domain symbols are mapped to the K subcarriers used for transmission, and zero symbols are mapped to the remaining N−K subcarriers. An N-point IFFT is then performed on the N frequency-domain symbols and zero symbols to obtain a sequence of N time-domain chips. The last C chips of the sequence are copied to the start of the sequence to form an SC-FDMA symbol that contains N+C chips.

A transmitter transmits the N+C chips of an OFDM symbol or an SC-FDMA symbol in N+C chip/sample periods. A symbol period is the duration of one OFDM symbol or one SC-FDMA symbol and is equal to N+C chip/sample periods.

A receiver obtains N+C time-domain samples for the transmitted OFDM symbol or SC-FDMA symbol, where each sample corresponds to a transmitted chip. The receiver removes C samples for the cyclic prefix and obtains a sequence of N samples. The receiver may then perform an N-point FFT on the N samples to obtain N frequency-domain symbols for the N total subcarriers. These frequency-domain symbols may be expressed as:

$$X(k)=H(k)\cdot S(k)+N(k), \text{ for } k=0,\ldots,N-1, \quad \text{Eq (1)}$$

where

S(k) is a symbol transmitted on subcarrier k,

H(k) is a complex channel gain for subcarrier k,

X(k) is a symbol received on subcarrier k, and

N(k) is the noise at the receiver for subcarrier k.

The receiver may recover the transmitted symbols as follows:

$$\hat{S}(k) = \frac{X(k)}{\hat{H}(k)} \approx S(k) + \tilde{N}(k), \text{ for } k = 0, \ldots, N-1, \quad \text{Eq (2)}$$

where $\hat{H}(k)$ is an estimate of the channel gain for subcarrier k, $\hat{S}(k)$ is an estimate of the symbol transmitted on subcarrier k, and $\tilde{N}(k)$ is the post-processed noise.

As shown in equation (2), the receiver may recover the symbol S(k) sent on subcarrier k based on the received symbol X(k) and the channel gain estimate $\hat{H}(k)$ for that subcarrier. The receiver may also recover the transmitted symbols in other manners.

The transmitter may transmit a pilot on one interlace and may transmit data on the remaining interlaces. The receiver may estimate the channel gains for data subcarriers based on the pilot received on pilot subcarriers. A data subcarrier is a subcarrier used for data transmission, and a pilot subcarrier is a subcarrier used for pilot transmission. The receiver may then use the channel gain estimates for demodulation of the data subcarriers.

The receiver may need to recover data from only one or few interlaces. In this case, it is more efficient to perform processing for only the interlace(s) of interest instead of all M interlaces. The gain in efficiency is especially pronounced when N is large (e.g., N=4096).

The receiver may perform partial FFT to efficiently obtain frequency-domain symbols for one or more interlaces of interest. The partial FFT comprises (1) pre-processing on the time-domain samples to obtain intermediate samples and (2) FFT processing on the intermediate samples to obtain frequency-domain symbols for each interlace of interest.

An N-point Fourier transform may be expressed as:

$$X(k) = \sum_{n=0}^{N-1} x(n) \cdot W_N^{kn}, \text{ for } k = 0, \ldots, N-1, \quad \text{Eq (3)}$$

where x(n) is a time-domain sample for sample period n, and $$W_N^{kn} = e^{-j\frac{2\pi \cdot kn}{N}}$$

is a complex value on a unit circle and determined by k, n and N. $W_N^{kn}$ a phasor that rotates around a unit circle at a rate determined by k and n.

The Fourier transform for the K subcarriers in interlace m, where m∈{0, . . . , M−1}, may be expressed as:

$$X_m(k) = X(Mk+m), \quad \text{for } k=0,\ldots,K-1, \qquad \text{Eq (4)}$$
$$= \sum_{n=0}^{N-1} x(n) \cdot W_N^{(Mk+m)n},$$
$$= \sum_{n=0}^{N-1} x(n) \cdot W_N^{mn} \cdot W_K^{kn},$$

where $X_m(k)$ is the k-th frequency-domain symbol for interlace m and is also the frequency-domain symbol for subcarrier Mk+m.

In equation (4), for each value of k in interlace m, a summation is performed over N values of $x(n) \cdot W_N^{mn} \cdot W_K^{kn}$, for n=0, ..., N−1, to obtain $X_m(k)$. However, the term $W_K^{kn}$ is periodic in K, so that $W_K^{kn} = W_K^{k(n+K)} = \ldots = W_K^{k(n+K(M-1))}$. Hence, each set of M values for $x(n) \cdot W_N^{mn}$ with the same value of $W_K^{kn}$ may be accumulated.

The following term may be defined:

$$y_m(n) = \sum_{i=0}^{M-1} x(n+K \cdot i) \cdot W_N^{m(n+K \cdot i)}, \quad \text{for } n=0,\ldots,K-1, \qquad \text{Eq (5)}$$

where $y_m(n)$ is the n-th intermediate sample for interlace m. The M values accumulated in equation (5) are for time-domain samples that are spaced apart by K and are associated with the same value of $W_K^{kn}$.

The frequency-domain symbols for interlace m may then be expressed as:

$$X_m(k) = \sum_{n=0}^{K-1} y_m(n) \cdot W_K^{kn}, \quad \text{for } k=0,\ldots,K-1. \qquad \text{Eq (6)}$$

Equation (6) indicates that the K frequency-domain symbols for interlace m may be obtained by performing a K-point FFT on K intermediate samples $y_m(n)$ for interlace m. The receiver may perform a K-point FFT for each interlace of interest, which may be much more efficient than performing an N-point FFT for all M interlaces and extracting the frequency-domain symbols for the interlace(s) of interest.

The intermediate samples in equation (5) may be rewritten as:

$$y_m(n) = \sum_{i=0}^{M-1} x(n+K \cdot i) \cdot W_M^{mi} \cdot W_N^{mn}, \quad \text{for } n=0,\ldots,K-1. \qquad \text{Eq (7)}$$

The following term may be defined:

$$Z_m(n) = \sum_{i=0}^{M-1} x(n+K \cdot i) \cdot W_M^{mi}, \quad \text{for } n=0,\ldots,K-1, \qquad \text{Eq (8)}$$

where $Z_m(n)$ is the n-th transformed sample for interlace m. Equation (8) indicates that $Z_m(n)$ may be obtained by performing an M-point FFT on M time-domain samples $x(n+K \cdot i)$ for i=0,...,M−1. These time-domain samples are spaced apart by K.

The intermediate samples may then be expressed as:

$$y_m(n) = Z_m(n) \cdot W_N^{mn} \text{ for } n=0,\ldots,K-1. \qquad \text{Eq (9)}$$

Equation (9) indicates that the intermediate samples may be obtained by multiplying the transformed samples $Z_m(n)$ with $W_N^{mn}$, which is commonly referred to as a twiddle factor, a phasor, a unit complex value, and so on.

If only one interlace is of interest, then the intermediate samples for this interlace may be obtained as follows:

$$\tilde{x}_m(n) = x(n) \cdot W_N^{mn}, \quad \text{for } n=0,\ldots,N-1, \qquad \text{Eq (10)}$$

$$y_m(n) = \sum_{i=0}^{M-1} \tilde{x}(n+K \cdot i), \quad \text{for } n=0,\ldots,K-1, \qquad \text{Eq (11)}$$

where $\tilde{x}_m(n)$ is a rotated sample obtained by rotating x(n) by $W_N^{mn}$. Equation (10) rotates the time-domain samples to obtain rotated samples. Equation (11) accumulates the rotated samples to obtain the intermediate samples for one interlace m.

The pre-processing in equations (10) and (11) may be more computationally efficient when only one interlace is of interest. When more than one interlace is of interest, it may be more efficient to perform the pre-processing shown in equations (8) and (9). Hence, the intermediate samples may be derived in different manners depending on the number of interlaces of interest.

For partial FFT, the receiver may perform pre-processing on the time-domain samples as shown in equations (8) and (9) or equations (10) and (11) to obtain intermediate samples. The receiver may then perform FFT processing on the intermediate samples as shown in equation (6) to obtain frequency-domain symbols for each interlace of interest.

For clarity, the partial FFT is described below for a simple embodiment with N=8 total subcarriers, M=2 interlaces, and K=4 subcarriers in each interlace. Interlace 0 contains subcarriers 0, 2, 4 and 6, and interlace 1 contains subcarriers 1, 3, 5 and 7. From equation (7), the intermediate samples may be expressed as:

$$y_m(n) = \sum_{i=0}^{1} x(n+4i) \cdot W_2^{mi} \cdot W_8^{mn}, \quad \text{for } n=0,\ldots,3. \qquad \text{Eq (12)}$$

Equation (12) may be expanded as follows:

$$y_0(n) = x(n) + x(n+4), \text{ and} \qquad \text{Eq (13)}$$

$$y_1(n) = [x(n) - x(n+4)] \cdot W_8^n. \qquad \text{Eq (14)}$$

Equations (13) and (14) indicate that $y_0(n)$ and $y_1(n)$ may be obtained by performing a 2-point FFT on x(n) and x(n+4) and multiplying the second FFT output with a twiddle factor of $W_8^n$.

Figure 2:
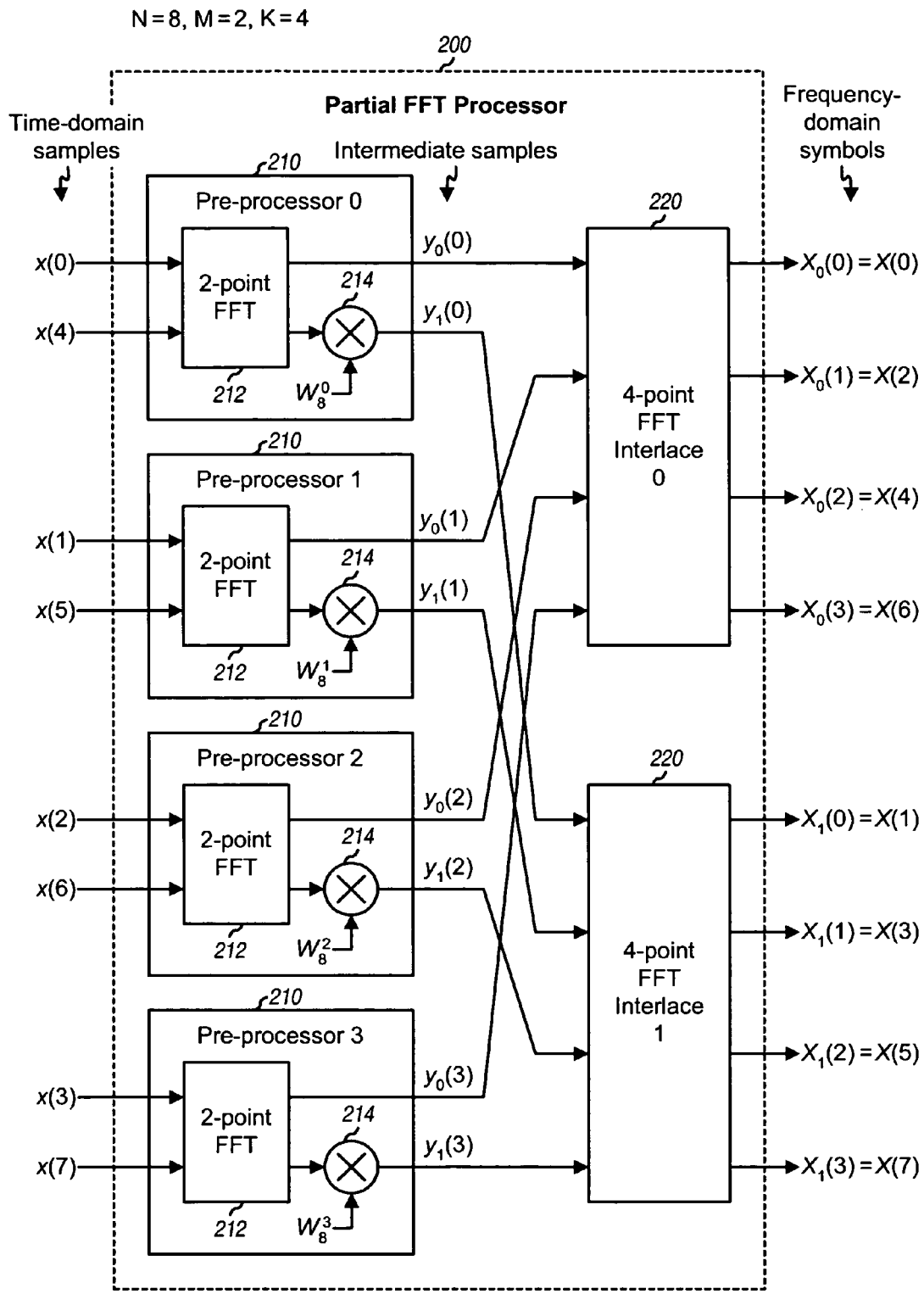
FIG. 2 shows a partial FFT processor for N=8, M=2, and K=4.

FIG. 2 shows a block diagram of an embodiment of a partial FFT processor 200 for the embodiment with N=8, M=2, and K=4. Partial FFT processor 200 includes four pre-processors 210 and two FFT units 220. Pre-processors 210 perform pre-processing on eight time-domain samples for one symbol period and generate eight intermediate samples for the two interlaces. Each pre-processor 210 performs pre-processing for one sample index. Within pre-processor n for sample index n, where n∈{0, 1, 2, 3}, an FFT unit 212 performs a 2-point FFT on two time-domain samples x(n) and x(n+4) and provides two FFT outputs. A multiplier 214 applies the twiddle factor $W_8^n$ on the second FFT output as shown in equation (14). Pre-processor n provides two intermediate samples $y_0(n)$ and $y_1(n)$ for sample index n.

Each FFT unit 220 performs FFT processing for one interlace. The FFT unit for interlace m, where $m \in \{0, 1\}$, receives four intermediate samples $y_m(0)$, $y_m(1)$, $y_m(2)$ and $y_m(3)$ for interlace m, performs a 4-point FFT on the four intermediate samples, and provides four frequency-domain symbols X(m), X(m+2), X(m+4) and X(m+6) for interlace m.

Figure 3A:
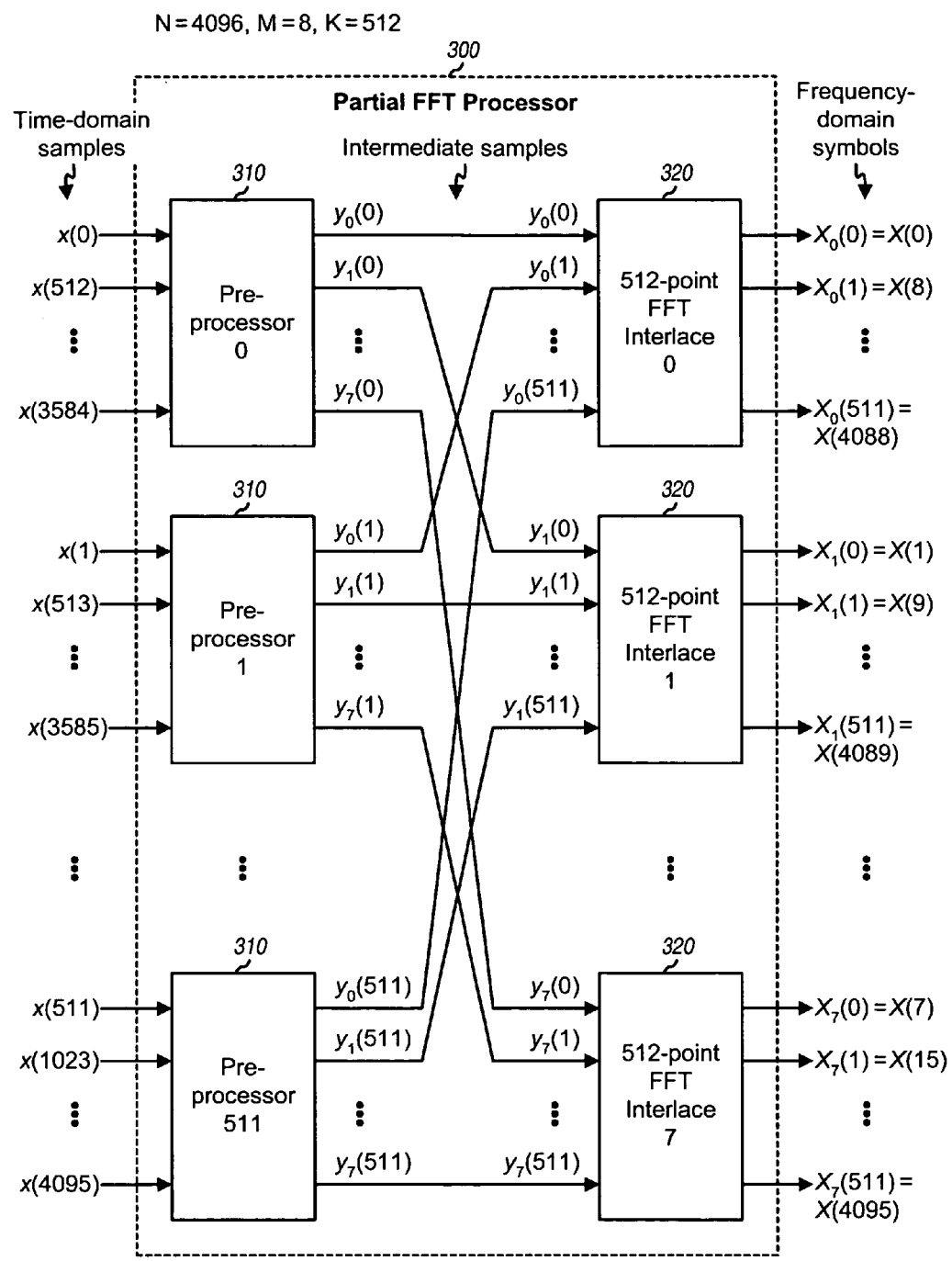
FIGS. 3A and 3B show a partial FFT processor for N=4096, M=8, and K=512.

FIG. 3A shows a block diagram of an embodiment of a partial FFT processor 300 for an embodiment with N=4096, M=8, and K=512. Partial FFT processor 300 includes 512 pre-processors 310 and eight FFT units 320. The 512 pre-processors 310 perform pre-processing on 4096 time-domain samples for one symbol period and generate 4096 intermediate samples for the eight interlaces. Each pre-processor 310 performs pre-processing for one sample index. Pre-processor n for sample index n receives eight time-domain samples that are spaced apart by 512 starting with sample index n, performs an 8-point FFT on the eight time-domain samples, applies a twiddle factor to each FFT output, and provides eight intermediate samples for sample index n. The intermediate samples may be generated for all eight interlaces or only the interlace(s) of interest.

Each FFT unit 320 performs FFT processing for one interlace. The FFT unit for interlace m receives 512 intermediate samples for interlace m, performs a 512-point FFT on the 512 intermediate samples, and provides 512 frequency-domain symbols for interlace m. A 512-point FFT may be performed for each interlace of interest.

Figure 3B:
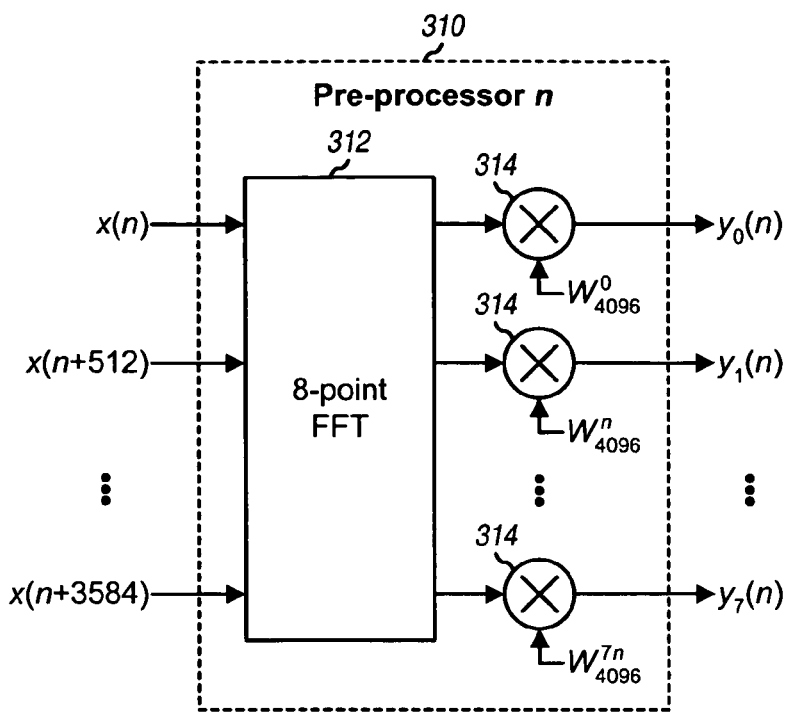

FIG. 3B shows a block diagram of an embodiment of pre-processor 310 in FIG. 3A. FIG. 3B shows the pre-processing for sample index n, where $n \in \{0, \ldots, 511\}$. Within the pre-processor, an 8-point FFT unit 312 receives eight time-domain samples x(n), x(n+512), ..., x(n+3584) that are spaced apart by 512, performs an 8-point FFT on the eight time-domain samples, and provides eight FFT outputs. Eight multipliers 314 scale the eight FFT outputs with eight twiddle factors and provide eight intermediate samples for sample index n.

Figure 4B:
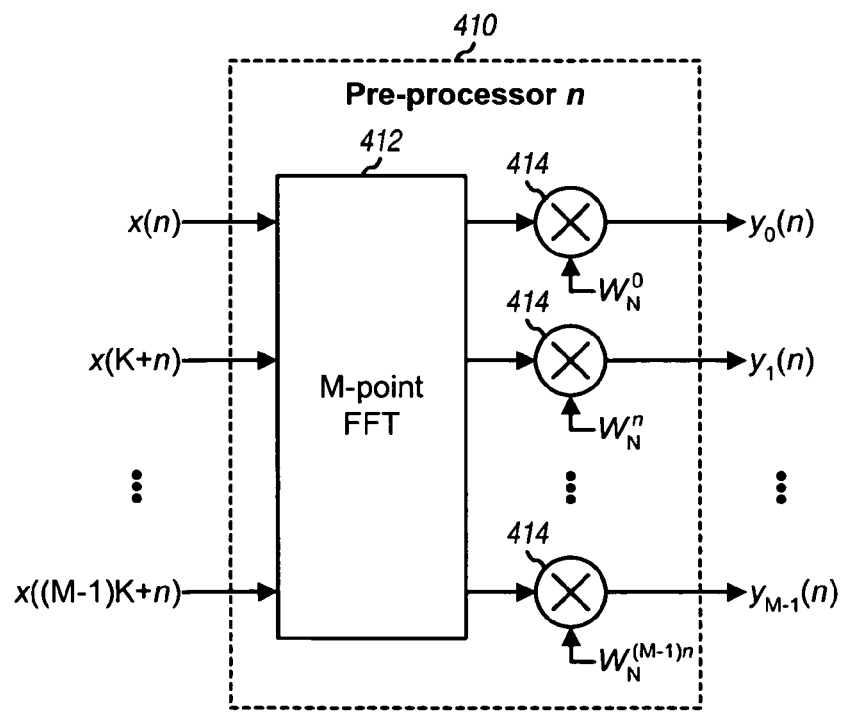
FIGS. 4A and 4B show a partial FFT processor for any N, M and K.
Figure 4A:
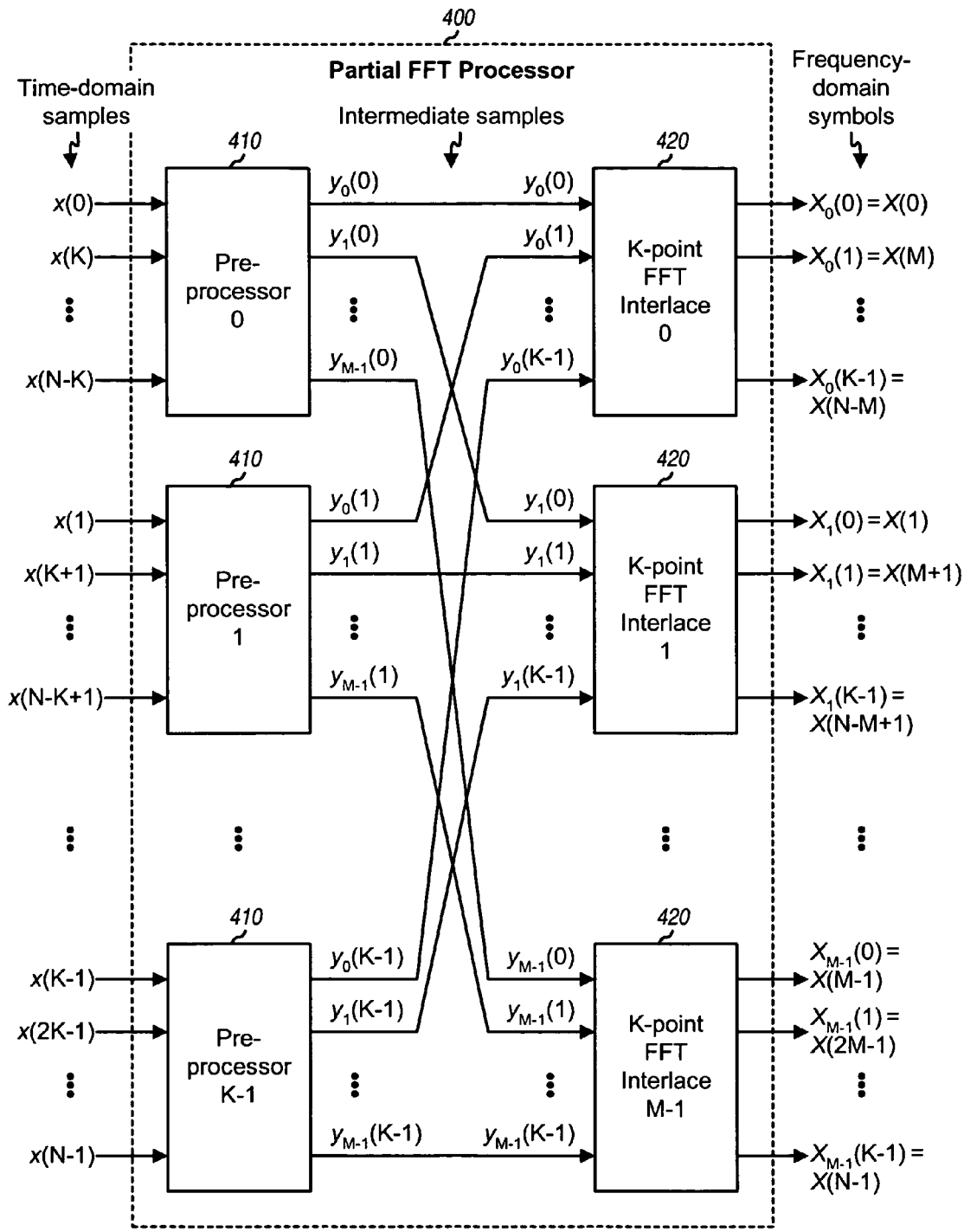

FIG. 4A shows a block diagram of an embodiment of a partial FFT processor 400 for any N, M and K. Within partial FFT processor 400, K pre-processors 410 perform pre-processing on N time-domain samples for one symbol period and generate N intermediate samples $y_m(n)$, for n=0, ..., K-1 and m=0, ..., M-1, for the M interlaces. Each pre-processor 410 performs pre-processing for one sample index. The pre-processor for sample index n receives M time-domain samples that are spaced apart by K starting with sample index n, performs an M-point FFT on the time-domain samples as shown in equation (8), applies M twiddle factors to the M FFT outputs as shown in equation (9), and provides M intermediate samples for sample index n.

M FFT units 420 perform FFT processing on the N intermediate samples and generate up to N frequency-domain symbols X(k), for k=0, ..., N, for the N total subcarriers. Each FFT unit 420 performs FFT processing for one interlace. The FFT unit for interlace m receives K intermediate samples for interlace m, performs a K-point FFT on the K intermediate samples as shown in equation (6), and provides K frequency-domain symbols for interlace m.

FIG. 4B shows a block diagram of an embodiment of pre-processor 410 in FIG. 4A. FIG. 4B shows the pre-processing for sample index n, where $n \in \{0, \ldots, K-1\}$. Within the pre-processor, an M-point FFT unit 412 receives M time-domain samples x(n), x(K+n), ..., x((M-1)K+n) that are spaced apart by K starting with sample index n, performs an M-point FFT on the M time-domain samples, and provides M FFT outputs. M multipliers 414 scale the M FFT outputs with M twiddle factors and provide M intermediate samples for sample index n.

FIGS. 2, 3A and 4A show the pre-processing to generate all N intermediate samples and the FFT processing to derive all N frequency-domain symbols for the M interlaces. In an embodiment, the pre-processing may be performed for, and shared by, all M interlaces. In this embodiment, the intermediate samples for all M interlaces are available after the pre-processing and may be used to derive frequency-domain symbols for any interlace of interest. In another embodiment, the intermediate samples may be generated for only the interlace(s) of interest. In both embodiments, a K-point FFT may be performed for each interlace of interest. The pre-processing and/or FFT processing may be performed by shared hardware in a time division multiplexed (TDM) manner to reduce hardware requirements. Alternatively, duplicate hardware may be used to perform pre-processing and/or FFT processing in parallel.

Substantial savings in computation and power may be realized when only one or few interlaces are of interest. This is because FFT processing is not performed for interlaces that are not of interest. When all M interlaces are of interest, the computation and power for the M interlaces are approximately equal to the computation and power for an N-point FFT. Hence, there is no penalty for receiving more interlaces.

A buffer may be used to store the time-domain samples for pre-processing and to store the intermediate samples for FFT processing. The buffer may be designed to store the samples in a manner that allows for easy storage and retrieval of the samples and supports in-place pre-processing and FFT processing. In-place processing means that the processing outputs may be written over the processing inputs, which reduces buffering requirements.

FIG. 5A shows an embodiment of a buffer 500 for the embodiment with N=4096, M=8, and K=512. In this embodiment, buffer 500 includes 8 columns for the 8 interlaces and 512 rows for the 512 subcarriers in each interlace. The time-domain samples are written into buffer 500 column-wise, starting with the first column. Pre-processing may commence after all 4096 time-domain samples are written to buffer 500.

Table 1 lists the order in which the rows are pre-processed to allow the subsequent FFT processing for the interlaces to be performed in place. Each block in Table 1 contains eight rows for a radix-8 FFT. All of the rows corresponding to a given block are pre-processed together. For block 0, rows 0, 64, 128, ..., 448 of buffer 500 are accessed, pre-processed, and stored in a transpose memory. After the pre-processing (8-point FFT and twiddle multiplication) is completed, the samples from the transpose memory are read out column-wise and written back to rows 0, 64, 128, ..., 448 of buffer 500. In essence, all 8 rows of each block are retrieved and pre-processed, and the intermediate results are transposed and written back to the same rows in buffer 500. This pre-processing allows the subsequent FFT computations to occur in place.

TABLE 1

| Block | Row Processing Order |
|---|---|
| 0 | 0, 64, 128, 192, 256, 320, 384, 448 |
| 1 | 1, 65, 129, 193, 257, 321, 385, 449 |
| . | . |
| . | . |
| . | . |
| 63 | 63, 127, 191, 255, 319, 383, 447, 511 |

After completing the pre-processing for all 512 rows, FFT processing may be performed for each interlace of interest. In particular, a 512-point FFT may be performed on the first 64 rows if interlace 0 is of interest, on the next 64 rows if interlace 1 is of interest, and so on.

FIG. 5B shows an embodiment of a buffer 510 for any N, M and K. In this embodiment, buffer 510 includes M columns for the M interlaces and K rows for the K subcarriers in each interlace. The time-domain samples are written into buffer 510 column-wise, starting with the first column. After all N time-domain samples are written to buffer 510, pre-processing may commence. The order of pre-processing may be determined by in-place computation requirements of the succeeding FFT. After completing the pre-processing for all K rows, FFT processing may be performed for each interlace of interest.

Figure 6:
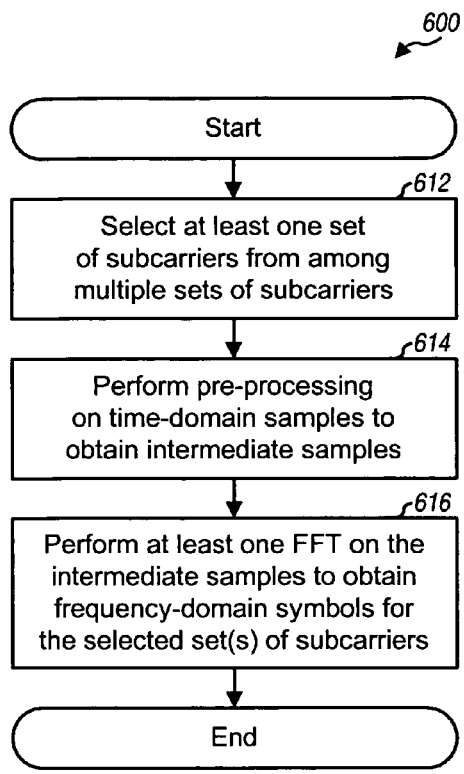
FIG. 6 shows a process to perform partial FFT for subcarriers of interest.

FIG. 6 shows an embodiment of a process 600 for performing partial FFT. At least one set of subcarriers is selected from among M sets of subcarriers (block 612). The selected subcarrier set(s) may include the subcarriers of interest and may carry data and/or pilot. Pre-processing is performed on time-domain samples to obtain intermediate samples (block 614). The pre-processing may comprise performing M-point FFTs on the time-domain samples and multiplying the FFT outputs with unit complex values or twiddle factors, e.g., as shown in equations (8) and (9). Alternatively, the pre-processing may comprise rotating the time-domain samples and accumulating the rotated samples, e.g., as shown in equations (10) and (11). The pre-processing may be performed in different manners depending on the number of subcarrier sets selected. The pre-processing may generate intermediate samples for all M sets of subcarriers or only the selected set(s) of subcarriers. In any case, at least one FFT is performed on the intermediate samples to obtain frequency-domain symbols for the selected set(s) of subcarriers (block 616). Each FFT may be a K-point FFT for one set of K subcarriers that are uniformly distributed across the N total subcarriers.

Figure 7:
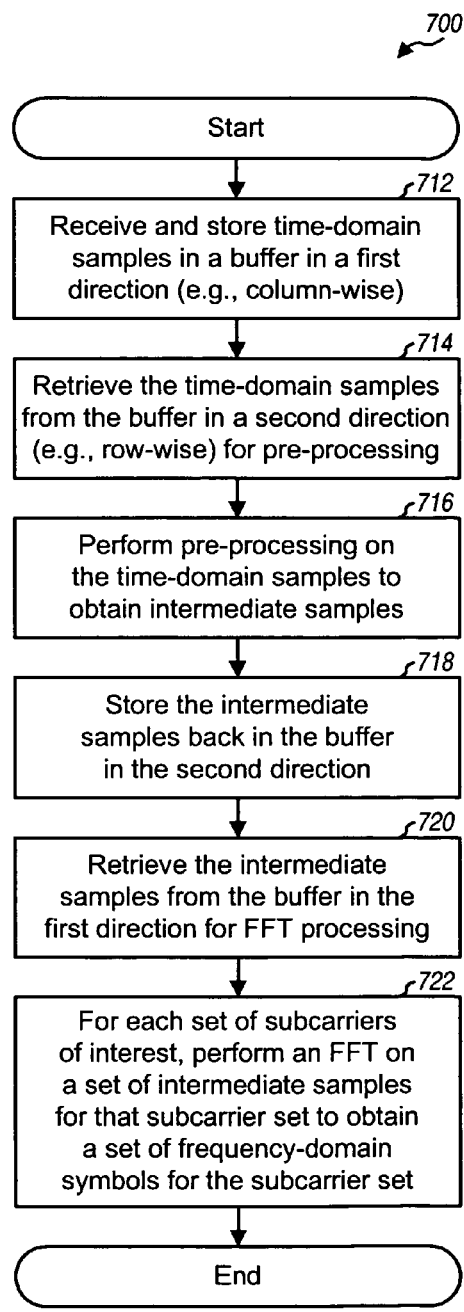
FIG. 7 shows a process to perform partial FFT and buffering.

FIG. 7 shows an embodiment of a process 700 for performing partial FFT and buffering. Time-domain samples are received and stored in a buffer in a first direction, e.g., column-wise (block 712). The time-domain samples are retrieved from the buffer in a second direction, e.g., row-wise, for pre-processing (block 714). Pre-processing is performed on the time-domain samples to obtain intermediate samples (block 716). The intermediate samples are stored back in the buffer in the second direction, e.g., replacing the retrieved time-domain samples (block 718). The intermediate samples are retrieved from the buffer in the first direction for FFT processing (block 720). For each set of subcarriers of interest, an FFT is performed on a set of intermediate samples for that subcarrier set to obtain a set of frequency-domain symbols for the subcarrier set (block 722).

Figure 8:
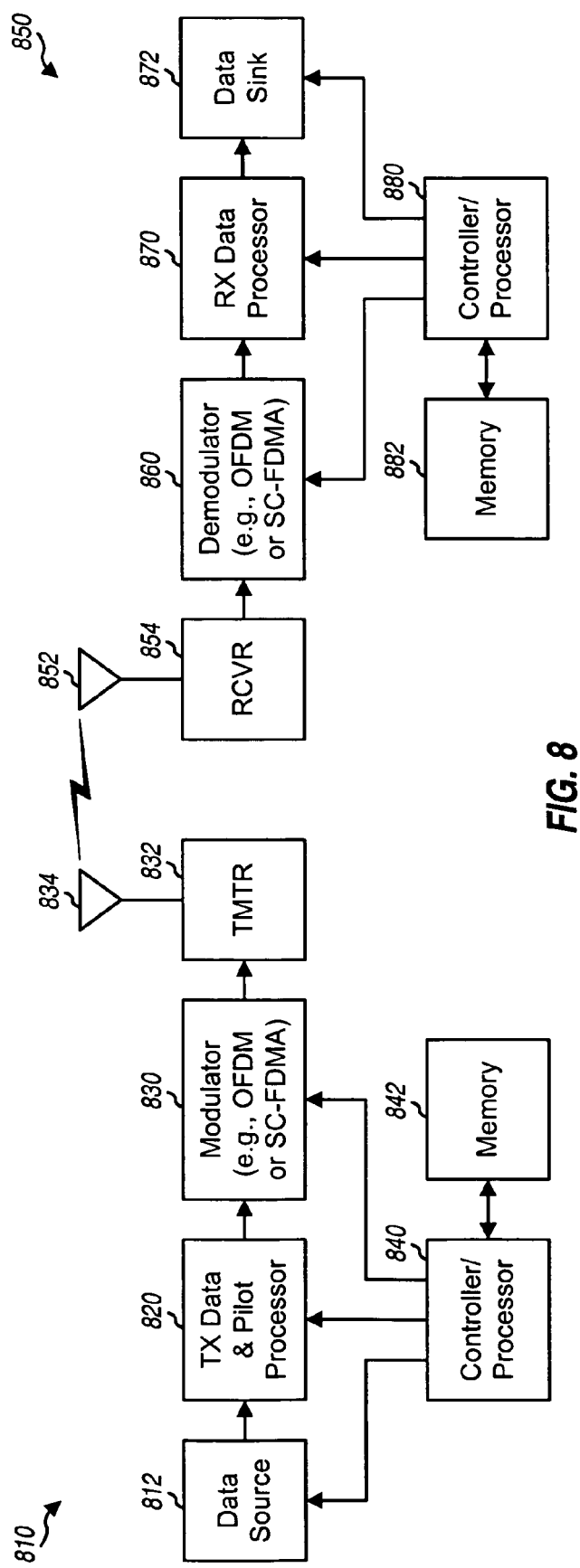
FIG. 8 shows a block diagram of a transmitter and a receiver.

FIG. 8 shows a block diagram of a transmitter 810 and a receiver 850. For simplicity, transmitter 810 and receiver 850 are each equipped with a single antenna. For the reverse link (or uplink), transmitter 810 may be part of a terminal, and receiver 850 may be part of a base station. For the forward link (or downlink), transmitter 810 may be part of a base station, and receiver 850 may be part of a terminal. A base station is a station that communicates with the terminals and may also be called a base transceiver system (BTS), an access point, a Node B, or some other terminology. A terminal may be fixed or mobile and may be a wireless device, a cellular phone, a personal digital assistant (PDA), a wireless modem, and so on.

At transmitter 810, a transmit (TX) data and pilot processor 820 receives traffic data from a data source 812, processes (e.g., formats, encodes, interleaves, symbol maps) the traffic data, and generates data symbols. Processor 820 also generates pilot symbols and multiplexes the data symbols and pilot symbols. A modulator 830 performs modulation on the data and pilot symbols and generates transmission symbols, which may be OFDM symbols or SC-FDMA symbols. A transmitter unit (TMTR) 832 processes (e.g., converts to analog, amplifies, filters, and frequency upconverts) the transmission symbols and generates a radio frequency (RF) modulated signal, which is transmitted via an antenna 834.

At receiver 850, an antenna 852 receives the RF modulated signal from transmitter 810 and provides a received signal to a receiver unit (RCVR) 854. Receiver unit 854 conditions (e.g., filters, amplifies, frequency downconverts, and digitizes) the received signal and provides time-domain samples. A demodulator 860 performs demodulation on the time-domain samples as described below and provides data symbol estimates, which are estimates of the data symbols sent by transmitter 810. A receive (RX) data processor 870 processes (e.g., symbol demaps, deinterleaves, and decodes) the data symbol estimates and provides decoded data to a data sink 872. In general, the processing by receiver 850 is complementary to the processing by transmitter 810.

Controllers/processors 840 and 880 direct the operation of various processing units at transmitter 810 and receiver 850, respectively. Memories 842 and 882 store program codes and data for transmitter 810 and receiver 850, respectively.

Figure 9:
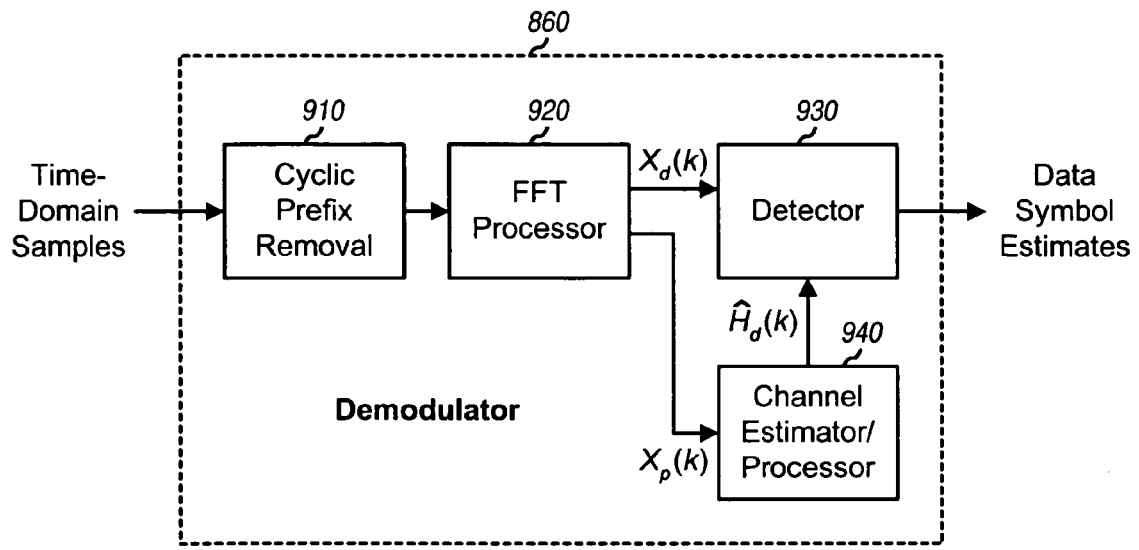
FIG. 9 shows a block diagram of a demodulator.

FIG. 9 shows a block diagram of an embodiment of demodulator 860 in FIG. 8. Within demodulator 860, a cyclic prefix removal unit 910 removes the cyclic prefix in each received OFDM symbol or SC-FDMA symbol and provides a sequence of N time-domain samples. An FFT processor 920 performs partial FFT, provides frequency-domain symbols $X_d(k)$ for data subcarriers to a detector 930, and provides frequency-domain symbols $X_p(k)$ for pilot subcarriers to a channel estimator/processor 940. Channel estimator/processor 940 derives channel gain estimates $\hat{H}_d(k)$ for the data subcarriers based on the frequency-domain symbols $X_p(k)$ for the pilot subcarriers, as described below. Detector 930 performs detection (e.g., equalization or matched filtering) on the frequency-domain symbols $X_d(k)$ for the data subcarriers, e.g., as shown in equation (2), and provides data symbol estimates for each interlace of interest. Detector 930 may also compute log-likelihood ratios (LLRs) for the data symbol estimates with the channel gain estimates and may provide the LLRs to RX data processor 870 for decoding.

Figure 10:
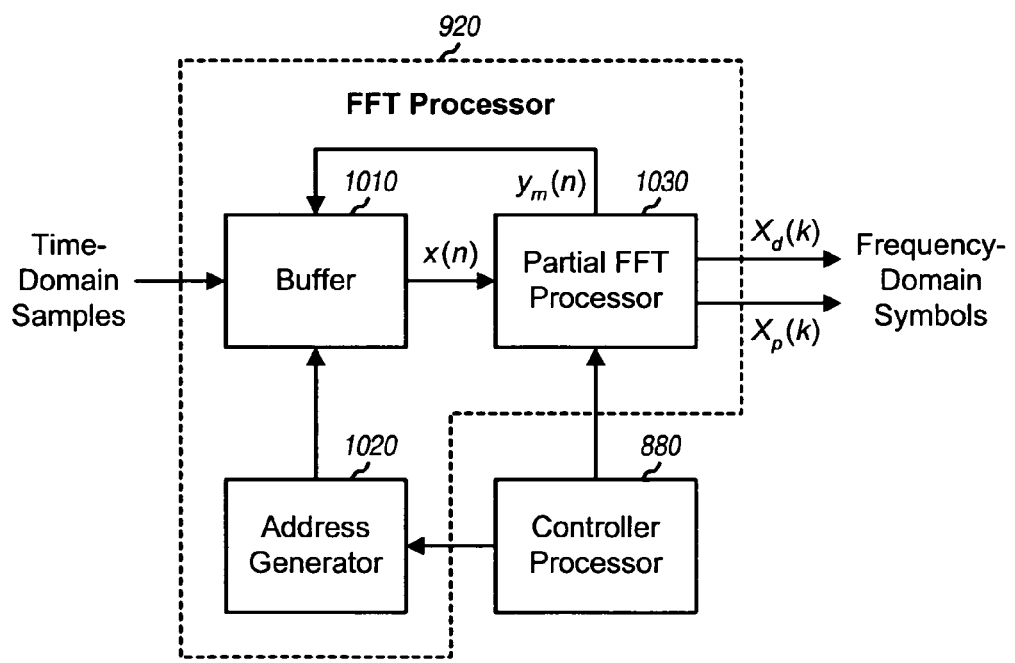
FIG. 10 shows a block diagram of an FFT processor.

FIG. 10 shows a block diagram of an embodiment of FFT processor 920 in FIG. 9. Within FFT processor 920, a buffer 1010 receives and stores the time-domain samples from receiver unit 854. Buffer 1010 may be implemented as shown in FIG. 5B with M columns for the M interlaces and K rows for the K subcarriers in each interlace. Buffer 1010 may store the incoming time-domain samples x(n) by columns, starting with the first column as shown in FIG. 5B. Buffer 1010 may provide the time-domain samples by rows for pre-processing and may stored the resultant intermediate samples $y_m(n)$ back in the same rows. Buffer 1010 may provide the intermediate samples by columns for FFT processing. An address generator 1020 generates addresses for writing samples to and reading samples from the proper locations in buffer 1010.

A partial FFT processor 1030 performs FFT processing for the interlace(s) of interest. Partial FFT processor 1030 may be implemented as shown in FIGS. 3A and 3B or FIGS. 4A and 4B. Partial FFT processor 1030 may provide frequency-domain symbols $X_p(k)$ for an interlace with pilot subcarriers and may provide frequency-domain symbols $X_d(k)$ for each interlace with data subcarriers that is of interest. Controller/processor 880 may select the interlace(s) of interest and may direct the operation of address generator 1020 and partial FFT processor 1030 to process the selected interlace(s).

Figure 11:
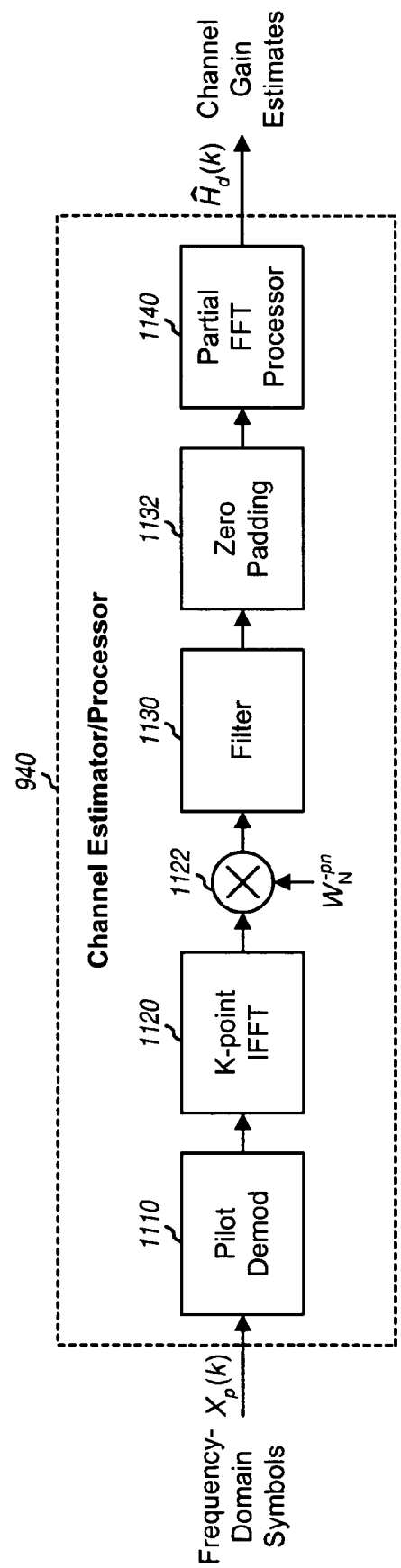
FIG. 11 shows a block diagram of a channel estimator/processor.

FIG. 11 shows a block diagram of an embodiment of channel estimator/processor 940 in FIG. 9. Within channel estimator/processor 940, a pilot demodulator (demod) 1110 removes the pilot from the frequency-domain symbols $X_p(k)$ for the pilot subcarriers and provides channel gain estimates for the subcarriers in interlace p, as follows:

$$\hat{H}_p(k) = X_p(k) \cdot P^*(k), \text{ for } k=0, \ldots, K-1, \quad \text{Eq (15)}$$

where

P(k) is a pilot symbol sent on the k-th subcarrier in interlace p, and $\hat{H}_p(k)$ is a channel gain estimate for the k-th subcarrier in interlace p.

An IFFT unit 1120 performs a K-point IFFT on the channel gain estimates $\hat{H}_p(k)$ and provides K time-domain channel taps $\hat{h}_p(n)$. A shift of p subcarriers in the frequency-domain corresponds to a linear phase shift of $W_N^{pn}$ in the time-domain. The channel taps $\hat{h}_p(n)$ are derived from the frequency-domain symbols for interlace p and hence contain a linear phase shift of $W_N^{pn}$, or $\hat{h}_p(n) \approx h(n) \cdot W_N^{pn}$. A multiplier 1122 multiplies the channel taps $\hat{h}_p(n)$ with a phasor $W_N^{-pn}$ and provides K derotated channel taps $\tilde{h}(n)$.

A filter 1130 filters the K derotated channel taps $\tilde{h}(n)$ across multiple symbol periods and provides K' filtered channel taps $\tilde{h}(n)$ having improved quality, where K' may be equal to or greater than K depending on the number of interlaces used for the pilot and the manner in which the filtering is performed. Filter 1130 may be implemented with a finite impulse response (FIR) filter, an infinite impulse response (IIR) filter, or some other type of filter. The filtering may also be performed at other locations along the channel estimation processing path. A zero-padding unit 1132 pads the K' filtered channel taps $\tilde{h}(n)$ with N−K' zeros and provides N values. A partial FFT processor 1140 performs pre-processing on the N values from unit 1132 and performs a K-point FFT for each interlace of interest, as described above. Processor 1140 provides K channel gain estimates $\hat{H}_d(k)$ for the K subcarriers in each interlace of interest. The channel gain estimates for the data subcarriers may also be obtained in other manners.

Figure 12:
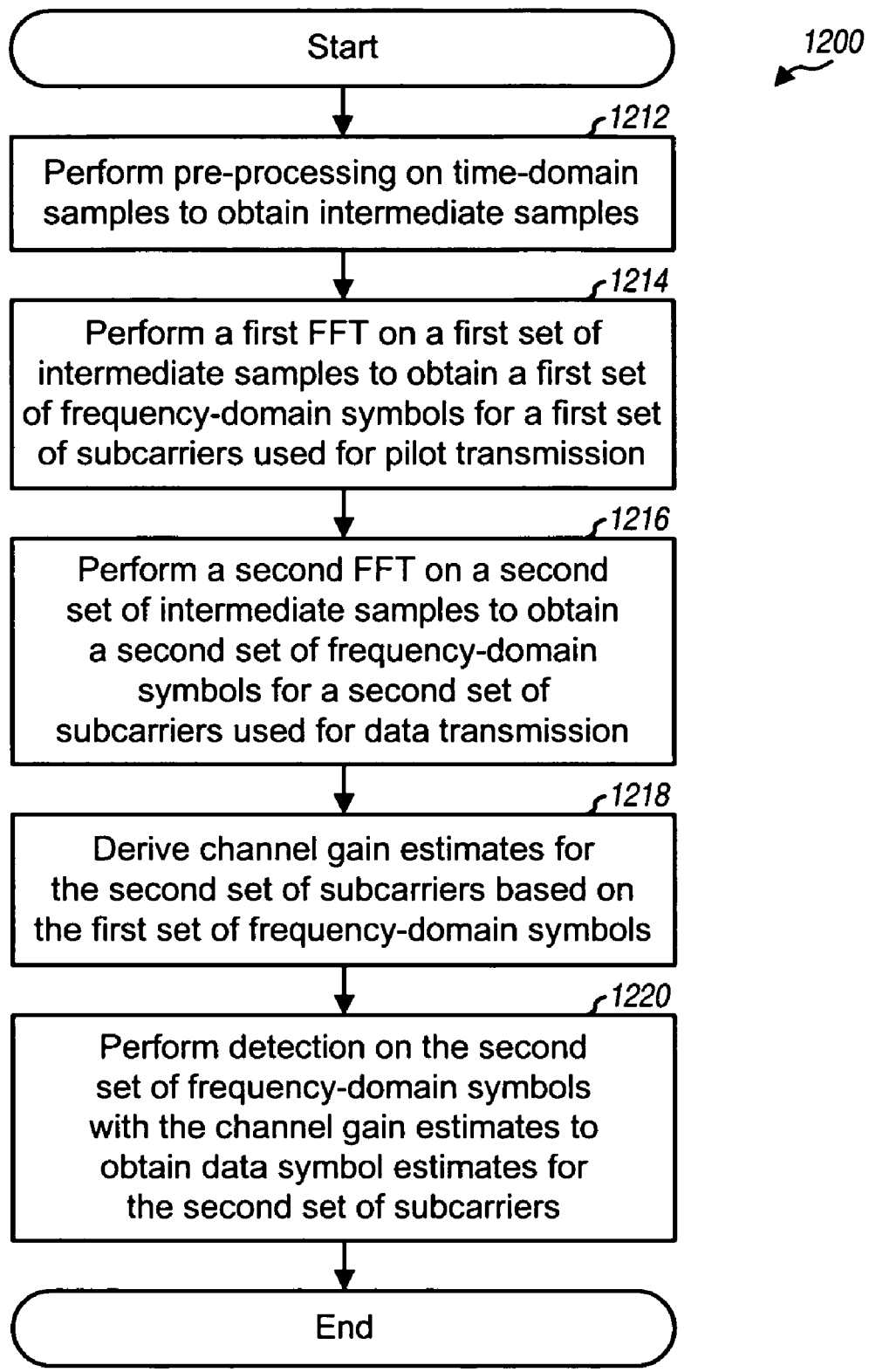
FIG. 12 shows a process to perform demodulation for subcarriers of interest.

FIG. 12 shows an embodiment of a process 1200 for performing demodulation for one or more sets of subcarriers of interest. Pre-processing is performed on time-domain samples to obtain intermediate samples, e.g., as shown in equations (8) and (9) (block 1212). A first FFT is performed on a first set of intermediate samples to obtain a first set of frequency-domain symbols for a first set of subcarriers used for pilot transmission (block 1214). A second FFT is performed on a second set of intermediate samples to obtain a second set of frequency-domain symbols for a second set of subcarriers used for data transmission (block 1216). Each FFT may be a K-point FFT for one set of K subcarriers that are uniformly distributed across the N total subcarriers. Channel gain estimates are derived for the second set of subcarriers based on the first set of frequency-domain symbols (block 1218). Detection is performed on the second set of frequency-domain symbols with the channel gain estimates to obtain data symbol estimates for the second set of subcarriers (block 1220). Blocks 1216 through 1220 may be performed for each additional set of subcarriers of interest.

For simplicity, the partial FFT and demodulation techniques have been described for the subcarrier structure shown in FIG. 1. These techniques may be used for other subcarrier structures. In general, the interlaces may include the same or different numbers of subcarriers. Each interlace includes subcarriers uniformly distributed across the N total subcarriers so that the simplification described above may be attained. For example, if N=4096, then interlace 0 may contain 32 subcarriers that are separated by 128 subcarriers, interlace 1 may contain 1024 subcarriers that are separated by 4 subcarriers, and so on. The pilot interlace may contain the same or different number of subcarriers than the data interlaces. Different subcarrier structures may result in different pre-processing and/or FFTs of different sizes being performed for the interlaces of interest.

For clarity, the techniques have been described for a single-input single-output (SISO) system. These techniques may also be used for a multiple-input single-output (MISO) system, a single-input multiple-output (SIMO) system, and a multiple-input multiple-output (MIMO) system. For a MIMO system, one FFT processor 920 may be used for each of multiple (R) antennas at the receiver. Each FFT processor 920 processes the time-domain samples for an associated receive antenna and provides frequency-domain symbols for that antenna. Spatial processing may be performed on the frequency-domain symbols for all R receive antennas to obtain data symbol estimates.

The techniques described herein may provide various advantages. First, the techniques may perform substantially fewer multiply and addition operations for the interlace(s) of interest than the number of multiply and addition operations required for an N-point FFT. This may result in lower power consumption, faster operating speed, greater data capability, and so on. Second, the techniques may perform substantially fewer memory accesses than the number of memory accesses required for an N-point FFT.

The techniques described herein may be implemented by various means. For example, these techniques may be implemented in hardware, firmware, software, or a combination thereof. For a hardware implementation, the processing units used to perform partial FFT and/or demodulation for the interlace(s) of interest may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 882 in FIG. 8) and executed by a processor (e.g., processor 880). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   at least one processor configured to select at least one set of subcarriers from among all sets of subcarriers where the at least one set is less than the all sets, to perform pre-processing on time-domain samples to obtain intermediate samples wherein the intermediate samples are defined by $$y_m(n) = \sum_{i=0}^{M-1} x(n+K\cdot i)\cdot W_N^{m(n+K\cdot i)}, \text{ for } n = 0, \ldots, K-1,$$

with x representing the time-domain samples, m representing the at least one set of subcarriers, M representing the all sets, K representing a quantity of the intermediate samples and W is a phasor that rotates around a unit circle, and to perform at least one fast Fourier transform (FFT) on the intermediate samples to obtain frequency-domain symbols for the at least one set of subcarriers; and a memory coupled to the at least one processor; wherein the memory is configured to store the time-domain samples in a first direction, and to provide the time-domain samples for pre-processing in a second direction and further wherein the first direction is column-wise and the second direction is row-wise.

2. The apparatus of claim 1, wherein the at least one processor is configured to perform M-point FFTs on the time-domain samples, where M is the number of sets of subcarriers, and to multiply outputs of the M-point FFTs with unit complex values to obtain the intermediate samples.

3. The apparatus of claim 1, wherein the at least one processor is configured to rotate the time-domain samples to obtain rotated samples, and to accumulate the rotated samples to obtain the intermediate samples.

4. The apparatus of claim 1, wherein the memory is configured to store the intermediate samples in the second direction, and to provide the intermediate samples for FFT processing in the first direction.

5. The apparatus of claim 1, wherein the at least one processor is configured to perform pre-processing in accordance with a pre-processing scheme selected based on the number of sets of subcarriers selected.

6. The apparatus of claim 1, wherein for each of the at least one set of subcarriers the at least one processor is configured to perform a K-point FFT on K intermediate samples to obtain K frequency-domain symbols for the set of subcarriers, where M×K=N, M is the number of sets of subcarriers, K is the number of subcarriers in each set, and N is the total number of subcarriers.

7. The apparatus of claim 1, wherein the at least one processor is configured to perform a first FFT on a first set of intermediate samples to obtain a first set of frequency-domain symbols for a first set of subcarriers used for pilot transmission, and to perform a second FFT on a second set of intermediate samples to obtain a second set of frequency-domain symbols for a second set of subcarriers used for data transmission.

8. The apparatus of claim 7, wherein the at least one processor is configured to perform a third FFT on a third set of intermediate samples to obtain a third set of frequency-domain symbols for a third set of subcarriers used for data transmission.

9. The apparatus of claim 7, wherein the at least one processor is configured to derive channel gain estimates for the second set of subcarriers based on the first set of frequency-domain symbols, and to perform detection on the second set of frequency-domain symbols with the channel gain estimates.

10. The apparatus of claim 1, wherein the multiple sets include equal number of subcarriers, and wherein the subcarriers in each set are uniformly distributed across system bandwidth.

11. The apparatus of claim 1, wherein the multiple sets of subcarriers are obtained with orthogonal frequency division multiplexing (OFDM).

12. The apparatus of claim 1, wherein the multiple sets of subcarriers are obtained with single-carrier frequency division multiple access (SC-FDMA).

13. A processor configured
to select at least one set of subcarriers from among all sets of subcarriers where the at least one set is less than the all sets, to store time-domain samples in a first direction, and to provide the time-domain samples for pre-processing in a second direction and further wherein the first direction is column-wise and the second direction is row-wise, to perform pre-processing on time-domain samples to obtain intermediate samples wherein the intermediate samples are defined by $$y_m(n) = \sum_{i=0}^{M-1} x(n+K\cdot i)\cdot W_N^{m(n+K\cdot i)}, \text{ for } n = 0, \ldots, K-1,$$

with x representing the time-domain samples, m representing the at least one set of subcarriers, M representing the all sets, K representing a quantity of the intermediate samples and W is a phasor that rotates around a unit circle, and to perform at least one fast Fourier transform (FFT) on the intermediate samples to obtain frequency-domain symbols for the at least one set of subcarriers.

14. The processor of claim 13, and configured to perform M-point FFTs on the time-domain samples, where M is the number of sets of subcarriers, and to multiply outputs of the M-point FFTs with unit complex values to obtain the intermediate samples.

15. The processor of claim 13, and configured to perform a K-point FFT on K intermediate samples for each of the at least one set of subcarriers to obtain K frequency-domain symbols for the set of subcarriers, where M×K=N, M is the number of sets of subcarriers, K is the number of subcarriers in each set, and N is the total number of subcarriers.

16. The processor of claim 13, and configured to perform a first FFT on a first set of intermediate samples to obtain a first set of frequency-domain symbols for a first set of subcarriers used for pilot transmission, and to perform a second FFT on a second set of intermediate samples to obtain a second set of frequency-domain symbols for a second set of subcarriers used for data transmission.

17. The processor of claim 16, and configured to derive channel gain estimates for the second set of subcarriers based on the first set of frequency-domain symbols, and to perform detection on the second set of frequency-domain symbols with the channel gain estimates.

18. A method comprising:
selecting at least one set of subcarriers from among all sets of subcarriers where the at least one set is less than the all sets; storing time-domain samples in a buffer in a first direction; retrieving the time-domain samples from the buffer in a second direction for pre-processing, wherein the first direction is column-wise and the second direction is row-wise; performing pre-processing on time-domain samples to obtain intermediate samples wherein the intermediate samples are defined by $$y_m(n) = \sum_{i=0}^{M-1} x(n + K \cdot i) \cdot W_N^{m(n+K \cdot i)}, \text{ for } n = 0, \ldots, K-1,$$

with x representing the time-domain samples, m representing the at least one set of subcarriers, M representing the all sets, K representing a quantity of the intermediate samples and W is a phasor that rotates around a unit circle; and performing at least one fast Fourier transform (FFT) on the intermediate samples to obtain frequency-domain symbols for the at least one set of subcarriers.

19. The method of claim 18, wherein the performing pre-processing comprises performing M-point FFTs on the time-domain samples, where M is the number of sets of subcarriers, and multiplying outputs of the M-point FFTs with unit complex values to obtain the intermediate samples.

20. The method of claim 18, further comprising: storing the intermediate samples in the buffer in the second direction; and retrieving the intermediate samples from the buffer in the first direction for FFT processing.

21. The method of claim 18, wherein the performing at least one FFT comprises performing a first FFT on a first set of intermediate samples to obtain a first set of frequency-domain symbols for a first set of subcarriers used for pilot transmission, and performing a second FFT on a second set of intermediate samples to obtain a second set of frequency-domain symbols for a second set of subcarriers used for data transmission.

22. The method of claim 21, further comprising: deriving channel gain estimates for the second set of subcarriers based on the first set of frequency-domain symbols; and performing detection on the second set of frequency-domain symbols with the channel gain estimates.

23. An apparatus comprising:
    means for selecting at least one set of subcarriers from among all sets of subcarriers where the at least one set is less than the all sets; means for storing time-domain samples in a first direction; means for providing the time-domain samples in a second direction for pre-processing, wherein the first direction is column-wise and the second direction is row-wise; means for performing pre-processing on time-domain samples to obtain intermediate samples wherein the intermediate samples are defined by $$y_m(n) = \sum_{i=0}^{M-1} x(n + K \cdot i) \cdot W_N^{m(n+K \cdot i)}, \text{ for } n = 0, \ldots, K-1,$$

with x representing the time-domain samples, m representing the at least one set of subcarriers, M representing the all sets, K representing a quantity of the intermediate samples and W is a phasor that rotates around a unit circle; and means for performing at least one fast Fourier transform (FFT) on the intermediate samples to obtain frequency-domain symbols for the at least one set of subcarriers.

24. The apparatus of claim 23, wherein the means for performing pre-processing comprises means for performing M-point FFTs on the time-domain samples, where M is the number of sets of subcarriers, and means for multiplying outputs of the M-point FFTs with unit complex values to obtain the intermediate samples.

25. The apparatus of claim 23, further comprising: means for storing the intermediate samples in the second direction; and means for retrieving the intermediate samples in the first direction for FFT processing.

26. The apparatus of claim 23, wherein the means for performing at least one FFT comprises means for performing a first FFT on a first set of intermediate samples to obtain a first set of frequency-domain symbols for a first set of subcarriers used for pilot transmission, and means for performing a second FFT on a second set of intermediate samples to obtain a second set of frequency-domain symbols for a second set of subcarriers used for data transmission.

27. The apparatus of claim 26, further comprising: means for deriving channel gain estimates for the second set of subcarriers based on the first set of frequency-domain symbols; and means for performing detection on the second set of frequency-domain symbols with the channel gain estimates.

28. Computer-readable medium encoded with a computer program to:
    select at least one set of subcarriers from among all sets of subcarriers where the at least one set is less than the all sets; store time-domain samples in a first direction; provide the time-domain samples for pre-processing in a second direction and further wherein the first direction is column-wise and the second direction is row-wise; perform pre-processing on time-domain samples to obtain intermediate samples wherein the intermediate samples are defined by $$y_m(n) = \sum_{i=0}^{M-1} x(n + K \cdot i) \cdot W_N^{m(n+K \cdot i)}, \text{ for } n = 0, \ldots, K-1,$$

with x representing the time-domain samples, m representing the at least one set of subcarriers, M representing the all sets, K representing a quantity of the intermediate samples and W is a phasor that rotates around a unit circle; and perform at least one fast Fourier transform (FFT) on the intermediate samples to obtain frequency-domain symbols for the at least one set of subcarriers.

29. The computer-readable medium of claim 28, and further encoded with the computer program to: perform M-point FFTs on the time-domain samples, where M is the number of sets of subcarriers, and multiply outputs of the M-point FFTs with unit complex values to obtain the intermediate samples.

* * * * *